United States Patent [19]

Weiss et al.

[11] Patent Number: 4,981,406
[45] Date of Patent: Jan. 1, 1991

[54] FASTENER SCREW THREAD AND PILOT TO AVOID CROSS THREADING

[75] Inventors: Ronald G. Weiss, Taylor; James A. Levitte, Plymouth; Jonathon P. Schmidt, Troy; Allan J. Theisen, Grosse Ile, all of Mich.

[73] Assignee: Ford Motor Company, Dearborn, Mich.

[21] Appl. No.: 279,731

[22] Filed: Dec. 5, 1988

[51] Int. Cl.$^5$ ............................................. F16B 25/00
[52] U.S. Cl. .................................... 411/386; 411/417; 411/426
[58] Field of Search .............. 411/337, 378, 386, 387, 411/411, 412, 416, 417, 423, 426

[56] References Cited

U.S. PATENT DOCUMENTS

| | | |
|---|---|---|
| 328,139 | 10/1885 | Patten .................................. 411/416 |
| 2,703,419 | 3/1955 | Barth . |
| 3,681,963 | 8/1972 | Muenchinger . |
| 3,724,315 | 4/1973 | Sygnator ......................... 411/417 X |
| 3,942,406 | 3/1976 | Egner . |
| 4,042,342 | 8/1977 | Muenchinger . |
| 4,069,730 | 1/1978 | Gutshall . |
| 4,235,149 | 11/1980 | Veldman . |
| 4,534,690 | 8/1985 | Barth ................................... 411/386 |
| 4,630,985 | 12/1986 | Simons ........................... 411/417 X |
| 4,789,288 | 12/1988 | Peterson ......................... 411/417 X |
| 4,915,560 | 4/1990 | Peterson .............................. 411/386 |

FOREIGN PATENT DOCUMENTS 120691  12/1945  Australia ............... 411/417

Primary Examiner—Gary L. Smith
Assistant Examiner—F. Saether
Attorney, Agent, or Firm—Frank G. McKenzie; Donald J. Harrington

[57]  ABSTRACT

A screw or bolt has a conventional threaded shank and a tapered pilot or lead end for easy entry to a threaded receptacle or nut. A pilot lead extends axially from the end of the shank. In one form, the pilot is cylindrical having an axis that either intersects or is parallel to the axis of the shank. Partial threads extend around the portion of the periphery of the pilot and an unthreaded transition surface angularly spaced from, transversely opposite, the partial threads extends to the outer surface of the shank. In another form, the pilot is elliptical having partial threads extending over a portion of its periphery and an unthreaded surface transversely opposite the pilot threads.

10 Claims, 6 Drawing Sheets

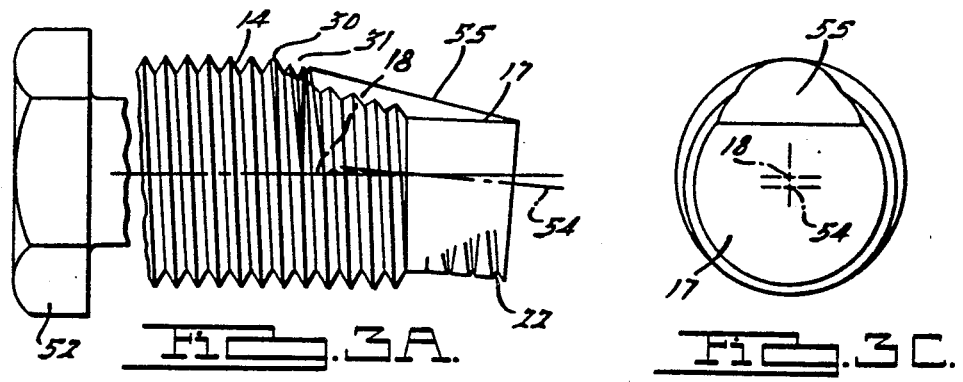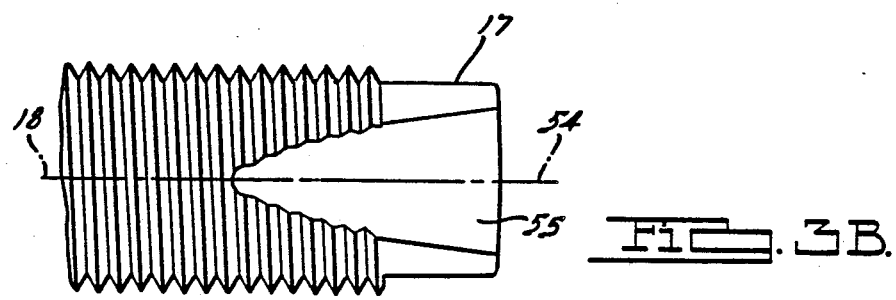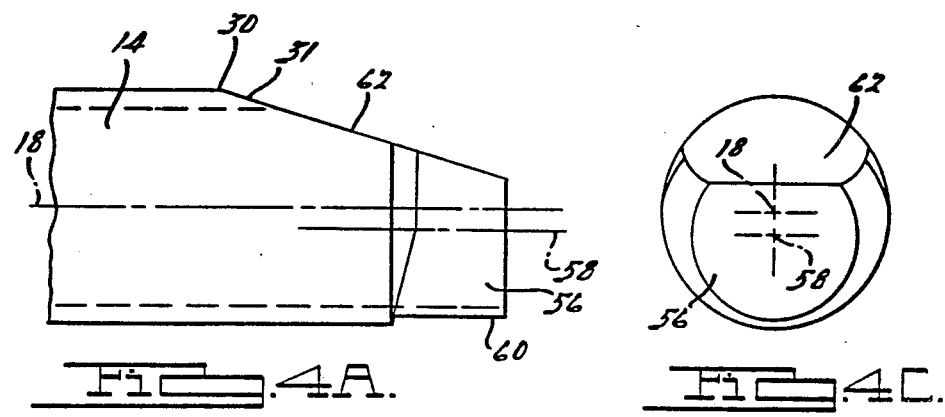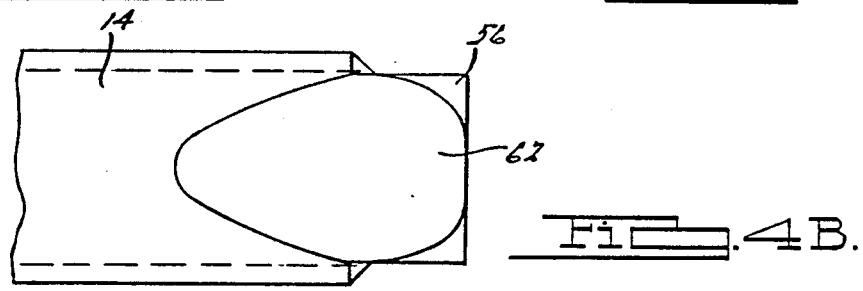

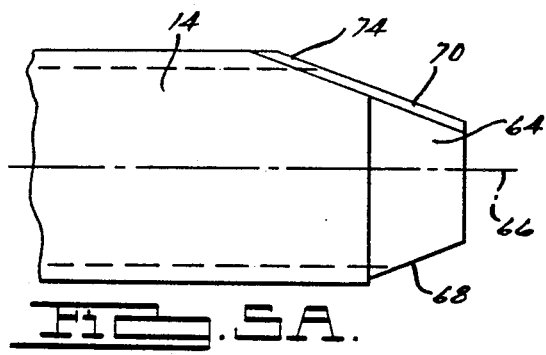
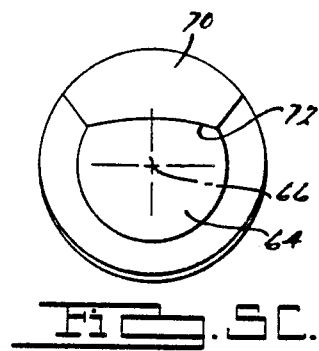
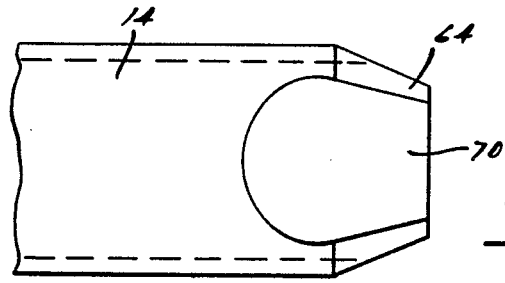
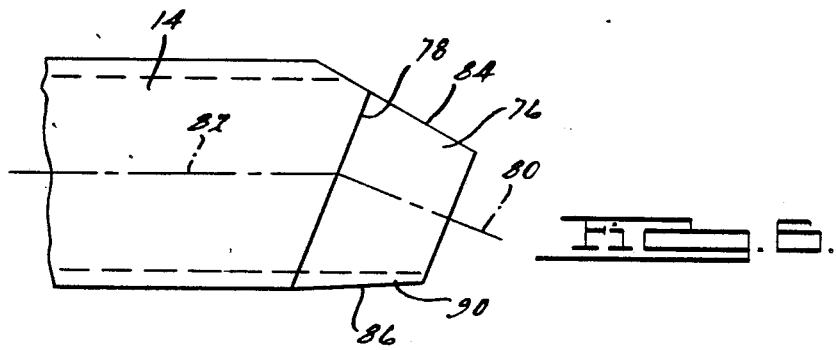
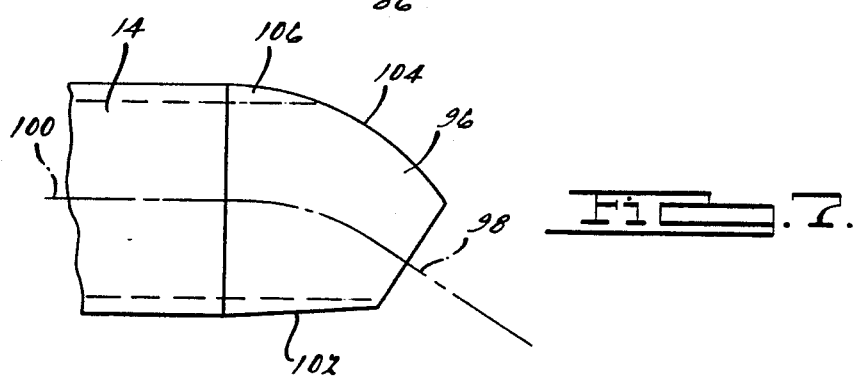

FASTENER SCREW THREAD AND PILOT TO AVOID CROSS THREADING

BACKGROUND OF THE INVENTION

1. Field of the Invention

This invention relates to the field of threaded fasteners. More particularly, the invention pertains to a pilot or lead located at the end of the fastener and adjacent screw threads that prevent cross threading when the fastener is threaded into an internally threaded receptacle such as a nut.

2. Description of the Prior Art

Generally, there is no difficulty in starting a threaded screw or bolt in a tapped hole or nut when the two mating parts have their longitudinal axes aligned. However, when the bolt enters the threaded part misaligned angularly with respect to the axis of the threaded nut, the threads may initially engage incorrectly. Thereafter, as the bolt is driven toward full engagement, the threads of the bolt and/or nut fail by shearing. This condition is called cross threading.

When the axis of the bolt or screw is excessively misaligned angularly with respect to the longitudinal axis of the nut, the operator readily perceives misalignment because the threads failed to engage. Generally, corrective action is taken to align the bolt with the nut. However, when misalignment is slight, the threads will engage on the bolt surface that first contacts the nut thread, but the bolt thread diametrically opposite the first threads engage the nut thread in such a way that cross threading results. In severe cases, the bolt is removed from the hole and the nut threads are retapped or the nut is replaced. When cross threading occurs in a modern assembly plant during repetitive operations at relatively high speed, time lost to correct cross threading is unacceptable. Costs associated with correcting this condition are correspondingly prohibitive.

Furthermore, cross threading occurs more frequently when portable power tools are used to drive the threaded fastener as is the case in a modern assembly plant. To avoid this difficulty, frequently the operator starts by hand the bolt threads into the nut to assure proper engagement of the first few bolt threads with those of the nut. Then, a pneumatic power source is attached to a socket that engages a hexagonal head on the end of the bolt. When conventional fasteners are used and angular alignment of the bolt is excessive, potential for cross threading is sensed by the operator when a bolt wobbles at the entrance of the threaded nut but will not engage. When this condition is observed, the operator attempts to realign the fastener and nut before power is again applied to drive the fastener to a fully engaged position.

Often the outermost threads of the nut become clogged with paint and other contaminants before the fastener is inserted. When accumulation of contaminants is large, proper threaded engagement is made more difficult and can induce cross threading. To avoid these difficulties, threaded fasteners have been formed with a lead end, which provides space into which the contaminants may accumulate after removal as the radially outer portions of the threaded lead engage the nut threads U.S. Pat. Nos. 3,681,963; 4,042,342; 4,235,149 and 2,703,419 describe threaded bolts and screws of this type.

U.S. Pat. No. 4,630,985 describes a self-aligning screw intended specifically to avoid cross threading. This screw contains a projection that extends radially from a tappered end such that when the axis of a screw is angularly misaligned with the axis of the internal threads of the nut, the projection makes first contact with the threads on the tapped hole. As the screw is turned, the projection follows the tapped threads of the hole and forces the screw to a position of substantial alignment with the axis of the nut. This projection is unable to align the fastener because no moment is developed to bring the screw axis into alignment with the nut.

Various asymmetrical pilot or lead portions extending from a threaded shank have been developed for use in self-tapping screws and bolts that cut threads in the part engaged by the screw. The pilot or lead surfaces are generally noncircular and result from use of inclined surface directed diagonally with respect to the axis of the shank. Examples of this technique are described in U.S. Pat. Nos. 3,942,406; 4,069,730; 4,534,690 and Australian patent No. 120,691.

A self-tapping screw having a cylindrical lead and a conical transition section located between a cylindrical shank and the lead is described in U.S. Pat. No. 3,724,315. The lead has a noncircular cross section and may have a drill point to facilitate cutting a hole in sheet metal or other material. Partial threads are formed on the conical section. Because this screw is self-tapping, i.e., it forms its own thread while being driven, it cannot cross-thread.

U.S. Pat. No. 4,789,288 describes a frusto-conical bolt lead having its axis parallel to, and offset from, the axis of the shank. A transverse cross section, perpendicular to the shank axis, taken at any point along the conical lead is a circle. The bolt includes one set of partial threads located at the end of the shank adjacent the lead, and a threadless surface diametrically opposite the partial threads.

SUMMARY OF THE INVENTION

To overcome the insufficiency of prior attempts to avoid cross threading when a fastener is angularly misaligned to a significant degree with respect to the axis of the threaded nut, a fastener according to the present invention develops a force couple, i. e., a restoring moment, tending to bring the axis of the fastener into substantial alignment with the axis of the nut. Development of the couple or moment is the result of a unique configuration of a pilot section located at the axial extremity of a threaded shank having the conventional right circular cylindrical shape. The fastener may include a headed end located at one end of the shank engagable by a tool that drives the fastener rotatably with respect to the nut, either manually or automatically. Located at the opposite end of the threaded shank is a pilot to facilitate insertion of the fastener within the threads of the nut by virtue of the smaller size of the pilot compared to the diameter of the shank.

The pilot may be formed by cold heading and is a circular cylinder having its axis intersecting the longitudinal axis of the shank or parallel and offset from the axis of the shank. A second form of the pilot is a circular cone whose central axis intersects the longitudinal axis of the shank. In another embodiment, the pilot is elliptical or a truncated ellipse.

In each of these configurations, several partial threads are formed on the pilot by rotating the fastener between thread-rolling dies with large forces applied in the radial direction, to impress the screw threads on the outer surface of the fastener. Generally, conical and cylindrical pilot ends extend radially outward from the axis of the shank less than the radius of the shank on which full threads are formed by the thread-rolling process. Accordingly, the threads formed on the pilot are partial threads that increase in the extent to which they approximate full threads as the distance from the axial end of the pilot increases. These partial threads furthermore extend only partially around the contour of the pilot section.

When the pilot takes the form of an ellipse, partial threads are formed as a result of the elliptical contour rolling between the fixed spacing between the thread-rolling die defined by the diameter of the shank, which is equal to or slightly larger than the major diameter of the elliptical pilot and larger than the minor diameter.

A transition surface, preferably one having a slight contour and being inclined with respect of the axis of the shank, is spaced angularly from the location of the partial threads on the pilot and extends from the axial end of the pilot to the shank. The last several threads formed by the thread-rolling dies on the surface of the shank adjacent the transition surface are incomplete threads whose height increases as distance from the axial end of the pilot increases.

Partial threads formed on each of the pilot sections are eccentric of the axis of the shank so that, during assembly as the threaded fastener is rotated with respect to the nut, the partial threads on the pilot engage only a portion of the nut thread. The angular position of this engagement varies continually as the threaded fastener rotates about its axis. The incomplete threads formed on the shank, where the unthreaded transition surface intersects the shank, include flat outer surfaces, when viewed in cross section, and rotate into contact with a relatively pointed apex of the nut threads. Angularly offset from the location of this engagement, the threads of the nut and partial threads on the pilot engage on the flanks of the adjacent screw threads. On these surfaces forces are developed as a result of the eccentricity between the axis of rotation and the axis of the pilot. When these forces increase in magnitude as the fastener rotates, a moment develops at the points of contact tending to align the axis of the bolt thread with the axis of the nut. When this realignment of axes occurs, the threads, on which the screw thread interference had developed, jump forward into threaded engagement with the nut thread. Thereafter, the fastener threads are properly aligned with the threads of the nut and cross threading is avoided.

However, if a moment tending to align the axis of the fastener with that of the nut is reacted by a larger moment tending to maintain the axes unaligned, as the force at the interference increases in magnitude due to rotation of the fastener, the threads of the fastener will shift backward in the nut after one complete turn of the fastener with respect to the nut. This prevents threaded engagement and avoids cross threading. As the fastener is again rotated, the partial threads on the shank again attempt to engage those of the nut and once again develop interference forces tending to restore the fastener to a position of alignment. This unsuccessful engagement and later disengagement produces a wobbling effect on the fastener seen by the operator so that action to correct alignment is taken. To permit alignment, the operator relaxes the force tending to misalign the axes. Then, the aligning moment, inherent in the design of the attachment of this invention, aligns the axes sufficiently to engage the threads.

BRIEF DESCRIPTION OF THE DRAWINGS

FIG. 3A-3C are side, top and end views of an angled lead point on an attachment according to the present invention.

FIGS. 4A-4C are side, top and end views of an offset pilot point on the end of a fastener according to the present invention.

FIG. 5A-5C are side, top and end views of a conical pilot at the end of a fastener according to the present invention.

FIG. 6 is a side view of a skewed conical pilot on the end of a fastener according to this invention.

FIG. 7 is a side view of a bent conical pilot on the end of a threaded fastener.

FIG. 8C is a view taken in direction 8C of FIG. 8A.

DESCRIPTION OF THE PREFERRED EMBODIMENT

Figure 1:
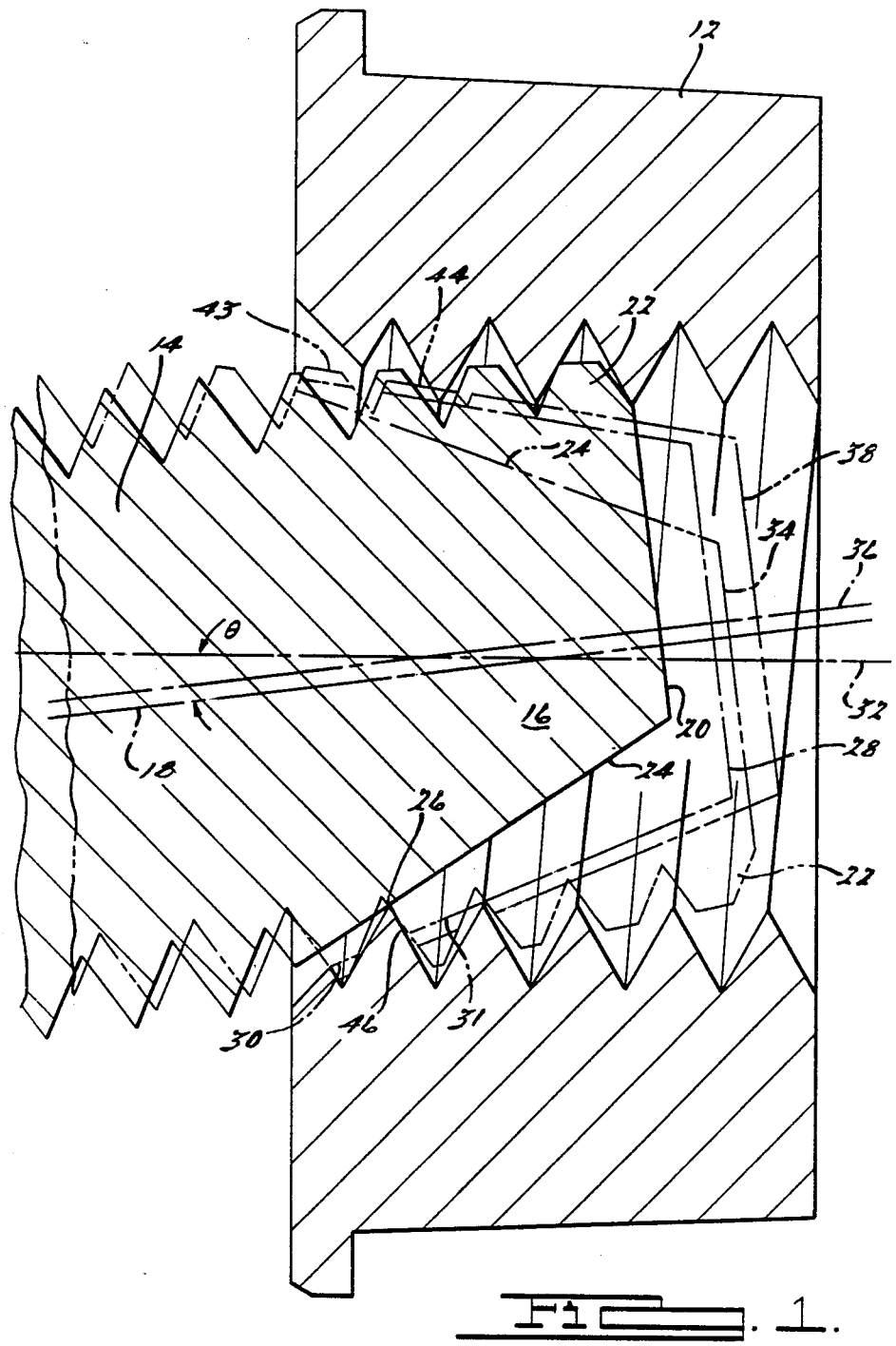
FIG. 1 is a cross section through the center line of a threaded fastener and nut showing, at four sequential angular positions of the fastener, the position of an unthreaded pilot surface and partial threads on the pilot in relation to the threads of the nut.
Figure 2:
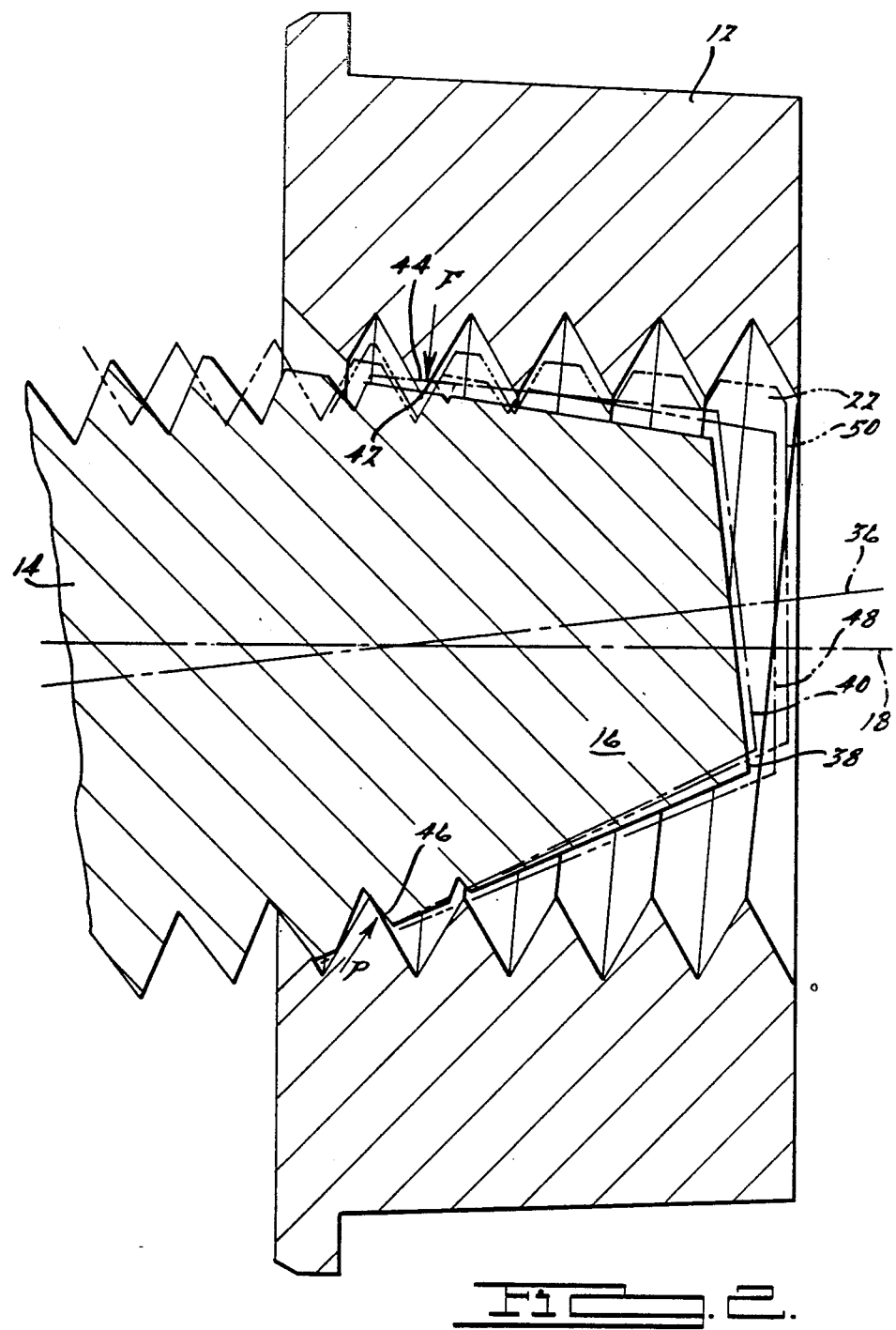
FIG. 2 is a cross section through the fastener and nut of FIG. 1 showing the fastener at several later angular positions during, the process of engaging the nut.

Referring first to FIGS. 1 and 2, a nut 12 has internal threads adapted to engage external threads formed on the cylindrical shank of a screw or bolt used to make a mechanical connection with a nut. Located at the axial end of the shank is a pilot or lead 16 having a transverse dimension generally smaller than the diameter of the shank to facilitate insertion within the threaded aperture of the nut and engagement of the shank threads with the nut threads.

This engagement is described next with reference to various angular positions of the shank. Throughout, the position of the nut is assumed fixed. Axis 18 of the shank is inclined with respect to the axis of the nut thread at an angle sufficiently large to produce cross threading with a conventional fastener. At the 0° position, pilot 16 is located at position 20 where partial threads 22 on the pilot engage nut threads on one side of axis 18, but unthreaded surface 24 is unengaged except for point contact on the crest of the last thread of the nut at point 26.

As the bolt rotates through 90° to position 28, the partial pilot thread pulls the bolt forward through the nut and engages the first few nut threads at 30, 31 with flank-to-flank contact The bolt axis is inclined with respect to the reference axis at the original angle theta, but axis 18 has moved upward to line 36 due to thread contact at 30, 31.

Rotation of the bolt to the 180° position 34 causes the bolt to move further into the nut, thereby bringing the partial threads 22 on the pilot into still further engagement and potential engagement with the nut threads. At position 34, axis 18 remains colinear with line 36, the position of axis 18 at the 90° position.

Rotation of the bolt with resPect to the nut through another 90° to the 270° position 38 causes the bolt to move still further into the nut due to engagement with the partial thread on the pilot. At position 38, axis 18 remains colinear with line 36.

In FIG. 2, the bolt is shown at progressively increasing angular positions beyond the 270° position 38, which is shown again for reference. When the bolt is rotated to the 285° position 40, eccentricity of the partial thread on the pilot causes the point of the nut thread to contact the truncated partial threads at the crest of the pilot threads. Rotation of the bolt with this interference causes a force F to develop at point of contact 42. This force increases in magnitude as the angle of rotation increases beyond this 285° point. The distance between the beginning of this contact at point 42 and point 44, where the pilot thread and nut threads would contact if interference were absent, is a measure of the magnitude of the force developed on the surface of contact. Continued rotation of the bolt increases the magnitude of this force.

Similarly, as seen in FIG. 1, because of the inclination of the axis of the shank with respect to the axis of the nut, a force P is developed at the point of contact 46 where the flank of the pilot thread contacts the flank of the thread. By maintaining the bolt inclined with respect to the axis of the nut, further rotation of the bolt increases the magnitude of force P.

These forces F and P form a couple or moment tending to align the shank axis with the nut axis. If the couple is greater than any external moment applied to the bolt, such as a moment applied by a driving tool where it engages the head of the bolt, the bolt is forced to rotate clockwise when viewed as in FIG. 2 from the position of line 36 to that of axis 37, thereby bringing the shank axis into proper alignment with the nut axis If the original inclination of axis 18 with respect to the nut axis is too great or the moment applied to the bolt head is too large in comparison to the magnitude of the couple developed on the threads, the partial threads on the pilot shift back to the previous nut thread. Then, as the bolt rotates to the 360° position 20, the process for engagement is repeated. This condition will continue causing a wobbling or vibration of the bolt and the driving tool in the joint until the operator improves the alignment of the bolt in the nut or removes the restraining moment that prevents alignment with the proper engagement. However, if the angle of inclination of axis 37 is small or if the moment opposing the force couple is relatively small, as the shank is rotated further to the 360° position 48, the partial threads on the pilot, those located above the axis of the nut in FIG. 2 where force F is developed, shift forward to the adjacent space between the nut thread causing a pivoting action of the bolt about point 46. This action causes line 36 to rotate into alignment with axis 37.

Thereafter, as the bolt is rotated to the 360° position 50, all of the partial threads on the pilot will have engaged the threads on the nut, the axes of the bolt and nut are substantially aligned, and the partial thread on the pilot below axes 37 in FIG. 2 remains engaged with the corresponding nut thread. With the bolt in this position, all of the threads of the shank are in position to engage the corresponding threads on the nut without cross threading.

Referring now to FIGS. 3A–3C, located at the opposite end of the cylindrical shank from pilot 17 is a hexagonal bolt head 52 adapted to be engaged and rotated by a driving tool, such as a wrench or pneumatically-operated socket, while the bolt is threaded into the nut. Pilot 17 is a circular cylinder formed by cold heading, located adjacent the end of the shank and having an axis 54 intersecting axis 18 of the shank. In the top view, FIG. 3B, axes 18 and 54 appear colinear because they are coplanar. A threadless transition surface 55 extends from the axial end of the pilot to the shank and is spaced angularly from, and transversely opposite, partial threads 22. The side view of FIG. 3C shows the centroid at the axial end of the pilot 54 offset from axis 18. Rolling the bolt between thread forming dies in the conventional manner forces partial threads on pilot 17 at 22 and on transition surface 55 at 30, 31.

In FIGS. 4A–4C, pilot 56 on the end of shank 14 is a circular cylinder formed by cold heading having its axis 58 parallel to shank axis 18 but transversely offset from the shank axis. The maximum radial extent of cylinder 56 from axis 18 is less than the diameter of the shank so that partial threads 60 are formed on the pilot section when the bolt threads are formed by a thread rolling die.

An unthreaded transition surface 62 extends from the axial end of the pilot into the shank thread transversely opposite partial thread 60. The intersection of surface 62 with the cylindrical surface of the shaft requires that the final few threads of the shank adjacent surface 62 are incomplete threads similar to 30 and 31.

FIGS. 5A–5C show a conical pilot lead 64 located at the end of shank 14. Axis 66 of the shank is colinear with the pilot axis. The maximum radial dimension of the pilot extends from axis 66 a shorter distance than the diameter of the shank. Therefore, in the process of roll-forming the threads, only partial threads 68 are formed on the conical pilot. Spaced angularly from the partial thread is a threadless transitional surface 70 extending from the axial end of the pilot to the shank. Surface 70 intersects circular cone 64 and truncates it so that a cross section through the cone has the form of FIG. 5C, a truncated circular section. Surface 70 is preferably contoured, as shown by line 72. Its intersection with the cylindrical surface of the shank produces partially formed truncated threads at 74. Partial threads 68 extend only partially around the circumference of conical pilot 64.

FIG. 6 shows an angled conical lead 76 abutting the end of cylindrical shank 14, the intersection of the cone and shank forming a canted edge 78. Axis 80 of cone 76 is inclined with respect to axis 82 of the shank. The radially outer surface of the cone 86 extends radially from axis 82 a smaller distance than the outer surface of shank 14. Therefore, in the process of forming threads on the shank and pilot, incomplete threads 90 are formed on the periphery of the cone. Transversely opposite the location of the partial threads 90 is a threadless surface 84 that extends from the axial end of the pilot to the shank. The inclination of surface 84 with the outer surface of the shank causes the final three or four threads near surface 84 to be incomplete and truncated, such as surfaces 43, 44 of FIGS. 1 and 2. A transverse cross section perpendicular to axis 82 through the conical pilot is an elliptical cross section.

The conical pilot 96 at the end of the bolt shown in FIG. 7 is formed by cold heading. Its axis 98 is bent radially downward from axis 100 of shank 14. In the cold heading process, the pilot is bent such that the radially outermost portion of the pilot extending from axis 100 is less than the radius of shank 14. For that reason, the subsequent operation, in which the bolt is rolled between thread-forming dies, produces incomplete threads in a region near the axial extremity of the pilot. These threads become progressively more complete as distance from the axial end increases. Pilot axis 98 is tangential to axis 100 at their intersection. An unthreaded transition surface 104 located transversely opposite the region of partial threads 102 is tangential also to the circumference of shank 14 so incomplete threads are formed in the vicinity of the point of tangency of surface 104 with the circumference of shank 14.

Figures 8A, 8C:
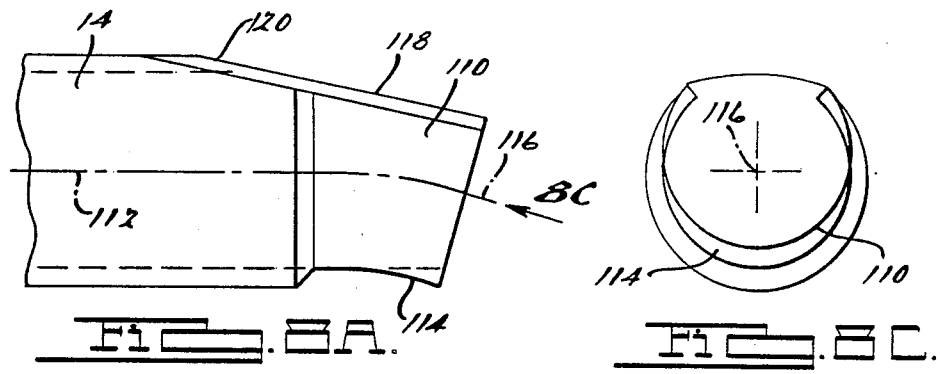
FIGS. 8A-8C are top, side and end views of a pilot lead whose axis is tangent to the longitudinal axis of the shank in an attachment according to this invention.
Figure 8B:
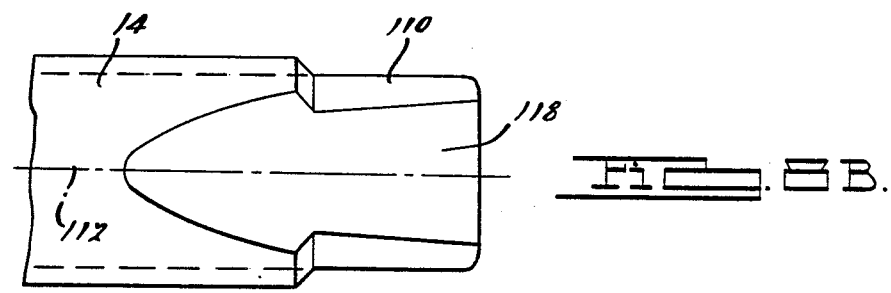

FIGS. 8A-8C show side, top and end views of another configuration, in which a circular cylindrical pilot 110, located at an end of shank 14 opposite the location of the head, is bent by a cold heading process such that the axis of the pilot is tangential to and intersects longitudinal axis 112 of shank 14. Cylinder 110 is bent such that the outermost radial extremity is less than the radius of the cylindrical surface of the shank. In this way, incomplete threads result at 114 near the axial end of cylinder 110. An unthreaded transitional surface 118 extending from the axial end of cylinder 114 to the shank 14 intersects the shank at a shallow angle, approximately 10°, so that the last several threads 120 formed at the end of the shank adjacent surface 118 are incomplete, truncated and have flats similar to surfaces 43, 44 of FIG. 1.

Figures 9A, 9C:
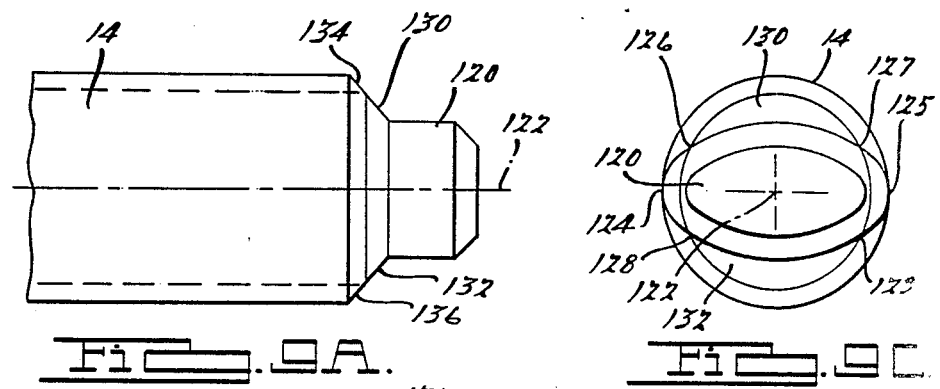
FIGS. 9A-9C are top, side and end views of an elliptical pilot at the end of a shank of a fastener according to this invention.
Figure 9B:
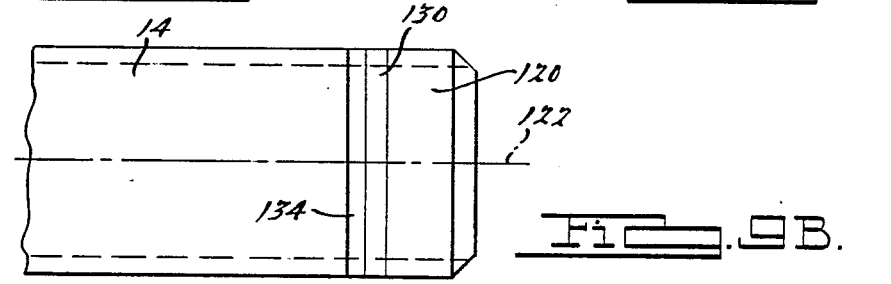

FIGS. 9A-9C show views of an elliptical pilot formed by cold heading and located at the end of circular cylindrical shank 14. The axis of pilot 122 is colinear with the axis of the shank, and the major diameter of the ellipse is substantially equal to the outer diameter of the shank thread. Therefore, a full thread is formed on the major diameter of the elliptical pilot at 124, 125. No thread is formed on the pilot between points 126, 127 and between points 128, 129 where the root diameter of this shank intersects the elliptical contour of the lead. Incomplete threads are formed between points 124-126, 124-128, 125-127 and 125-129. Therefore, two transition surfaces are formed: surface 130 extending angularly between points 126 and 127, and surface 132 extending angularly between points 128 and 129. Surfaces 130 and 132 are unthreaded and extend radially and longitudinally from the elliptical contour of the pilot to the circular cylindrical surface of the shank. These surfaces intersect the shank such that the last several threads formed on the shank in the vicinity of the transition surfaces at 134, 136 are incomplete threads whose height increases as distance from the pilot increases.

Figure 10A:
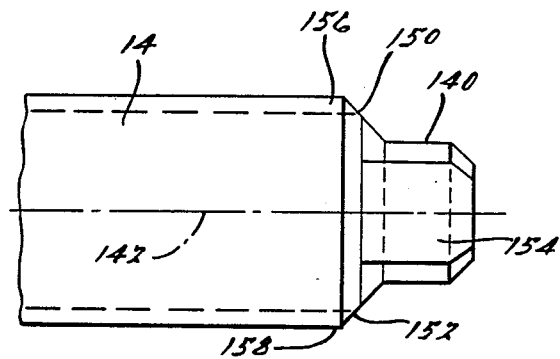
FIGS. 10A-10C are top, side and end views of a truncated elliptical pilot on the end of a threaded shank of a fastener according to this invention.
Figure 10C:
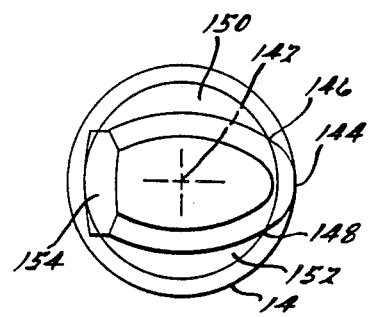
Figure 10B:
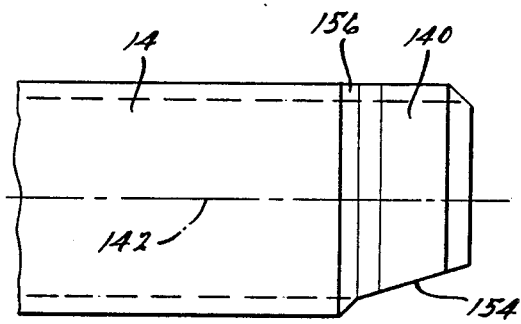

FIGS. 10A-10C show a second elliptical pilot 140 located at the end of cylindrical shank 14. Axes 142 of the pilot and shank are colinear. Threads formed by rolling the shank and pilot in thread-rolling dies are full along the length of the shank and on the pilot in the vicinity of point 144 where the major diameter of the ellipse intersects the circumference of the shank. At points 146 and 148, the root diameter of the shank threads is intersected by the elliptical contour of pilot 140. Incomplete threads result in the zone bounded by points 146 and 144 and in the zone between points 148 and 144. Unthreaded transition surfaces 150, 152 extend radially outward and longitudinally from the upper and lower pilot surfaces and to the outer diameter of the shank. At the intersection of surfaces 150 and 152 with the shank, the last few threads 156, 158 formed on the shank end near the pilot are incomplete. As seen best in FIG. 10C, surfaces 150 and 152 are contoured, but appear planar in the side view of FIG. 10B.

Another unthreaded surface 154 truncates the elliptical pilot on the left-hand side of the longitudinal plane that passes through the axis of the shank and extends radially outward and longitudinally from the end of the pilot to the shank. Consequently, the last several threads on the shank near the pilot formed by the thread rolling die are incomplete threads, whose depth increases to full depth as distance along the axis of the shank from the pilot increases. Surface 154 is also a contoured surface that appears planar in the top view FIG. 10A.

Having described the preferred embodiment of our invention, what we claim and desire to secure by U.S. Letters Patent is:

1. A threaded fastener for engaging a complementary threaded receptacle, into which the fastener is rotatably driven to produce a mechanical connection therebetween, comprising:

a right circular cylindrical shank having screw threads formed thereon and having a longitudinal axis;

means for rotating the fastener or receptacle with respect to the other of these;

a cylindrical pilot adjacent an end of the shank, having first screw threads formed on the surface thereof and spaced axially from the shank, said first screw threads extending angularly around a portion of the pilot surface, the crests of said first screw threads being truncated, the pilot having an axis that intersects the axis of the shank;

a threadless surface spaced angularly from the first screw threads, extending from pilot to shank, inclined with respect to the shank axis; and second screw threads located on the shank adjacent the threadless surface, said second screw threads extending angularly around the shank, the crests of said second screw threads being truncated by a portion of the threadless surface extending axially along the shank.

2. A threaded fastener for engaging a complementary threaded receptacle, into which the fastener is rotatably driven to produce a mechanical connection therebetween, comprising:

a cylindrical shank having screw threads formed thereon and having a longitudinal axis;

means for rotating the fastener or receptacle with respect to the other of these;

a cylindrical pilot adjacent an end of the shank, having a smaller diameter than the shank and first screw threads spaced axially from the shank, the pilot having an axis parallel to the axis of the shank, said first screw threads extending angularly around a portion of the pilot surface, the crests of said first screw threads being truncated;

a threadless surface spaced angularly from the first screw threads, extending from pilot to shank, inclined with respect to the shank axis, and second screw threads located on the shank adjacent the threadless surface, said threads extending angularly around the shank, the crests of said second screw threads being truncated by a portion of the threadless surface extending axially along the shank.

3. The fastener of claim 2 wherein the pilot is a right circular cylinder, and the depth of the second screw threads increases as distance from the end of the pilot increases.

4. A threaded fastener for engaging a complementary threaded receptacle, into which the fastener is rotatably driven to produce a mechanical connection therebetween, comprising:
- a right circular cylindrical shank having screw threads formed thereon and having a longitudinal axis;
- means for rotating the fastener or receptacle with respect to the other of these;
- a conical pilot adjacent an end of the shank, extending radially away from the axis of the shank, and having first screw threads formed on the surface thereof, said first screw threads extending angularly around a portion of the pilot surface, the crests of said first screw threads being truncated and spaced axially from the shank, the pilot having an axis that intersects or is tangent to the axis of the shank;
- a threadless surface spaced angularly from the first screw threads, extending from pilot to shank, inclined with respect to the shank axis; and
- second screw threads located on the shank adjacent the threadless surface, said second screw threads extending angularly around the shank, the crests of said second screw threads being truncated by a portion of the threadless surface extending axially along the shank.

5. The fastener of claim 4 wherein the pilot extends radially from the axis of the shank less than the radius of the shank.

6. A threaded fastener for engaging a complementary threaded receptacle, into which the fastener is rotatably driven to produce a mechanical connection therebetween, comprising:
- a right circular cylindrical shank having screw threads formed thereon and having a longitudinal axis;
- means for rotating the fastener or receptacle with respect to the other of these;
- a conical pilot adjacent an end of the shank, extending radially away from the axis of the shank, and having first screw threads formed on the surface thereof, said first screw threads extending angularly around a portion of the pilot surface, the crests of said first screw threads being truncated and spaced axially from the shank, the pilot having an axis colinear with respect to the axis of the shank;
- a threadless surface spaced angularly from the first screw threads, extending from pilot to shank, inclined with respect to the shank axis; and
- second screw threads located on the shank adjacent the threadless surface, said second screw threads extending angularly around the shank, the crests of said second screw threads being truncated by a portion of the threadless surface extending axially along the shank.

7. The fastener of claim 6 wherein the pilot extends radially from the axis of the shank less than the radius of the shank.

8. A threaded fastener for engaging a complementary threaded receptacle, into which the fastener is rotatably driven to produce a mechanical connection therebetween, comprising:
- a right circular cylindrical shank having screw threads formed thereon and having a longitudinal axis;
- means for rotating the fastener or receptacle with respect to the other of these;
- an elliptic cylindrical pilot adjacent an end of the shank, and having first incomplete screw threads formed thereon extending axially from the shank, the pilot having an axis colinear with the axis of the shank;
- a first threadless surface extending from pilot to shank, inclined with respect to the shank axis; and
- second incomplete screw threads located on the shank adjacent the first threadless surface.

9. The fastener of claim 8 further including a second threadless surface extending along the pilot length, truncating the pilot, inclined with respect to the pilot axis, and offset therefrom by a radial distance that increases as the second threadless surface approaches the shank.

10. The fastener of claim 8 wherein:
the minor diameter of the pilot is less than the diameter of the shank; and
the second incomplete screw threads are located adjacent the major diameter of the pilot on opposite sides of said major diameter.

* * * * *